United States Patent [19]
Mihalev et al.

[11] 3,820,957
[45] June 28, 1974

[54] CONTINUOUS POLYMERIZATION REACTOR

[76] Inventors: Nikolai Alexandrovich Mihalev, Gorkovskoi oblasti, prospekt Dzerzhinskogo, 5, kv.46; Boris Petrovich Shtarkman, Gorkovstoi oblasti, prospekt Lenina, 65, kv. 63, both of Dzerzhinsk, U.S.S.R.

[22] Filed: Mar. 22, 1972

[21] Appl. No.: 236,831

[52] U.S. Cl. ............... 23/285, 23/252, 23/290.5, 159/11 B, 260/94.9 P
[51] Int. Cl. .................................. C08f 1/98
[58] Field of Search .......... 23/285, 290.5, 252 R; 260/95 R, 94.9 P; 159/11, 11 B

[56] References Cited
UNITED STATES PATENTS

| | | | |
|---|---|---|---|
| 2,944,877 | 7/1960 | Marco | 23/290.5 |
| 3,047,368 | 7/1962 | Marco | 23/252 |
| 3,356,461 | 12/1967 | Lynch et al. | 23/290.5 |

*Primary Examiner*—James H. Tayman, Jr.
*Attorney, Agent, or Firm*—Holman and Stern

[57] ABSTRACT

A continuous polymerization reactor comprising plates discs arranged in a reactor body and mounted on a common drive shaft with stationary discs disposed therebetween. The stationary discs are provided with riffles wherein screws are arranged, interacting with helical grooves of a thread made on the flat sides of the plates. Said helical grooves communicate with one another in succession through clearance between the stationary discs and distance sleeves fastened on the drive shaft between the stationary discs, and through clearances between the reactor body and the plates. The reactor is provided with a means for removing volatile components from the mass of material being processed.

11 Claims, 6 Drawing Figures

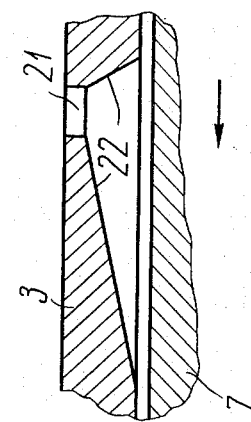
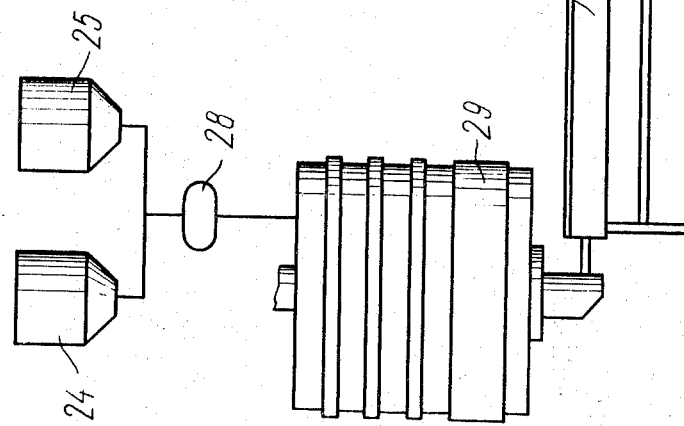

CONTINUOUS POLYMERIZATION REACTOR

The present invention relates to apparatus for the production and processing of polymer materials, and more particularly to continuous polymerization reactors. The reactor proposed herein in combination with a shaping tool can be employed for the continuous manufacture of articles directly from the monomer to profile polymer articles, or for making granules suited for further processing by injection or extrusion moulding techniques.

Continuous polymerization reactor are known in the art having a screw extruder with an evacuation zone for the removal of volatile components from the reaction medium, or having a series of such extruders.

Such a reactor features several temperature zones along the screw. The material processed in such reactor is transferred by the action of the helical thread of the screw thereof.

The material to be polymerized is fed into the reactor in a form of a monomer or a prepolymer through the charging opening in the reactor. Said charge is transferred as a thin layer in the grooves of the helical thread of the reactor screw through all the temperature zones while the material undergoes a required degree of conversion, and while in the form of a polymer melt, being passed through the evacuation zone wherein the removal of volatile components from the melt takes place, is extruded through a shaping tool in the form of an endless profile article.

Reactors of a screw extruder type, however, have a number of disadvantages.

The residence time of the material in the polymerization zone of the reactor is quite significant, especially if the polymerization is carried out to maximum degrees of conversion, but when utilizing the single-screw and, especially, the use of the multi-screw extruder the transfer capacity is considerably high, and therefore the reactor is to be operated with a low screw speed so as to ensure an adequate residence time for the material being polymerized in the reactor. For this reason it is not always possible to utilize the maximum transferring capacity of the screws in order to ensure optimum performance of the reactor.

Reactors having a single-screw type are sometimes employed when polymerization is to be carried out to a degree of conversion of from 60 to 80 percent, since the polymerization reaction is decelerated at the last stages of conversion, and the polymerization were to be complete, either the overall dimensions of the reactor would have to be increased so to surpass any reasonable limits, or the reactor throughput would have to be substantially diminished.

Moreover, in reactors of the single-screw type the material being polymerized is prone to sticking to the surface of the screw, causing a reduction in the reactor throughput capacity and troubles the normal operation thereof.

Considering the object of creating adequate conditions for the removal of volatile components from the mass of material being polymerized in reactors of the single-screw type, the depth of the screw thread in the zone of removal of volatile components must be made so large, and the thread pitch so much larger than that of the preceding and subsequent zones, that the material within said portion of the thread does not fill the entire free space of the thread grooves.

This does ensure a reduction in the pressure and in the material density within the zone for removal of volatile components.

However, due to a high density of the material being evacuated, such as polymethyl methacrylate, the evolution of volatile components is accompanied by the formation of a foam which gradually clogs the openings through which the evacuation zone of the reactor communicates with the mass of the material being evacuated.

This circumstance imposes limitations on the effective time performance of the reactor having such an evacuation system.

Also continuous polymerization reactors known in the art (cf. Author's Certificate of the USSR No. 147,170) intending to enhance the intensity of the polymerization process by increasing the heat transfer surface area per unit volume of the material being polymerized use rotary discs with spaces for the circulation of a heat carrier, said discs being arranged in the reactor body and mounted on a common drive shaft.

For conveying the material being polymerized through the reactor and for varying the residence time of the material in the reactor, the reactor employs an adjustable gear-type discharging device arranged at the reactor outlet. For uniform distribution of the material being polymerized in the spaces between the rotary discs, each disc has a sector-shaped opening, these openings with the neighbouring discs being shifted through 180°. For enhancing the heat transfer from the reaction mass to the heat carrier, stationary scrapers are arranged between the rotary discs, these scrapers precluding the formation of a crust on the surfaces of said discs.

The material to be polymerized, after being fed into the reactor, moves along the heat exchange surfaces of the discs between all the rotary discs in succession and then leaves the reactor through the discharging device thereof. In the course of the polymerization reaction taking place while the material moves through the reactor, the required degree of conversion is thus attained.

This reactor, however, is not free from certain disadvantages. The material being polymerized can move within the reactor either by gravity or under the effect of externally applied pressure only. In case of bulk polymerization, e.g., of styrene or methyl methacrylate, the reaction mass at the last stages of conversion has a high viscosity which materially hampers its transfer in such a reactor.

Besides, in the above-described reactor, shear strains interfere with the intensive mixing of the material, so that the temperature uniformity of a highly viscous reaction mass in such a reactor is much more inferior than that attainable in, say, a reactor of the screw extruder type, although the first-mentioned reactor is simpler in design, and continuous polymerization plants based on such reactors feature essentially smaller overall dimensions than those built around other known reactors.

It is an object of the present invention to provide such a continuous polymerization reactor which would feature comparatively small overall dimensions, would ensure high throughput capacity per unit volume of the equipment, reliable transfer of the material through the reactor, and which would produce polymer material with constant quality characteristics.

Said object is accomplished by the fact that in a continuous polymerization reactor comprising a body; a drive shaft arranged in said body; plates mounted on said common drive shaft in said body one above the other; distance sleeves mounted on said drive shaft between said plates and said plates being provided with spaces for the circulation of a heat carrier; a means for the transfer of the material being processed through the reactor and having a uniform distribution thereof among said plates, and according to the invention, said means for the transfer and uniform distribution of the material comprises stationary discs arranged between said plates; screws arranged in riffles made in said stationary discs so as to come in engagement with helical grooves of a thread made on the flat sides of said plates, said helical grooves communicating with one another in succession through clearances provided between said stationary discs and the external cylindrical surfaces of said distance sleeves and through clearances provided between the reactor body and the external cylindrical surfaces of said plates, at least one of said stationary discs being provided with a means for the removal of volatile components from the mass of the material being processed.

It is preferable that the external cylindrical surface of each plate should be made non coaxial about the drive shaft, and that a scraper should be secured in the reactor body, this scraper bearing against the external cylindrical surface of the plate along its generating line.

It is also preferable that the external cylindrical surface of each distance sleeve should be made non coaxial about the drive shaft, and that a scraper be secured on each stationary disc, this scraper bearing against the external cylindrical surface of the distance sleeve along its generating line.

The inner cylindrical surface of the reactor body can be made non-coaxial about the outer cylindrical surface of the plate, with a scraper being secured on the external cylindrical surface of the plate so that said scraper should bear against the internal cylindrical surface of said body over the entire height of the clearance provided between the reactor body and the external cylindrical surface of the plate.

The inner cylindrical surface of the stationary disc can be made non-coaxial about the outer cylindrical surface of the distance sleeve, with a scraper being secured on the external cylindrical surface of the distance sleeve so that said scraper should bear against the internal cylindrical surface of the stationary disc along its generating line.

It is preferable that the means for the removal of volatile components from the mass of the material being processed should comprise an evacuation chamber arranged in one of the stationary discs and communicating with the mass of the material being processed through at least one opening made in said stationary disc and shaped as a slit with slanting faces facing the respective plate from the side thereof where the material being processed moves in the helical grooves of the thread from the central zone of the reactor to the peripheral zone thereof.

In the reactor proposed herein the polymerization reaction proceeds at a comparatively high speed under optimal temperature conditions for the differing degrees of conversion in a thin layer of the material being polymerized, with intensive mixing thereof due to the shearing strains under viscous friction between the movable surfaces in relation to each other, thus ensuring a high temperature uniformity of the reaction medium.

The present reactor features highly developed heat exchange surfaces, much exceeding those featured by the prior-art reactors per unit volume of the material being polymerized.

In the present reactor the undesirable sticking of the material being polymerized to the heat exchange surfaces is precluded, and a high coefficient of heat transfer from the reaction medium to the heat carrier is thus ensured, and the temperature conditions of the polymerization reaction can be easily controlled.

The present reactor ensures an effective removal of the residual monomer and other volatile substances by passing a thin layer of the material being polymerized through the reduced-pressure zone of the reactor at a rather high temperature.

The overall dimensions of the present reactor are comparatively small.

The last-mentioned advantage featured by the reactor of the invention can be made more fully apparent by comparing this reactor with that of screw extruder type, wherein the polymerization conditions are similar to those existing in the present reactor.

In case the polymerization is to be run to high degrees of conversion with a sufficiently high throughput per unit volume of the equipment, a plurality of screw extruder type reactors will be required.

For the sake of comparison, an extruder with a screw having a diameter of 90 mm may be cited, such an extruder is usually employed for producing profile articles of most conventional sizes, with the standard dimensional characteristics of the screw (the length of the threaded screw portion being equal to 17 diameters thereof and the screw thread pitch being equal to the external diameter thereof).

While making the comparison, it should be borne in mind that with all other things being equal, the residence time of the material being polymerized in the reactors compared depends on the total length of the screw groove.

In our reactor the groove is made on the flat surfaces of the plate along a helix.

The groove having the same length and the same profile dimensions as in the 90 mm diameter screw taken for comparison, comparison can be made on both sides of a plate not exceeding 600 mm in diameter. Along a length equal to 17 diameters of the screw it is possible to locate such a number of plates that the total length of their grooves will be not less than 5 times the total length of the groove of the screw taken for comparison; in other words, along this length a reactor can be arranged equal to the plurality of screw extruder type reactors in terms of the length of the path travelled by the material being polymerized in the reactor. Thus, a plant employing the present reactor will prove to be more compact than with the use of a stage-type reactor.

Given hereinbelow is a detailed description of exemplary embodiments of the present invention, with due reference to the accompanying drawings, wherein:

FIG. 5 is a section taken along the line V—V in FIG. 4; and

FIG. 6 diagrammatically shows how the herein-proposed reactor can be incorporated in a line producing polymer article profiles.

The present continuous polymerization reactor comprises stationary discs 1, 2, 3 and 4 arranged one above the other (FIGS. 1 and 2) and provided with spaces for the circulation of a heat carrier. Rings 5 arranged between the stationary discs 1, 2, 3 and 4 constitute the body of the reactor together with the said discs.

Figure 1:
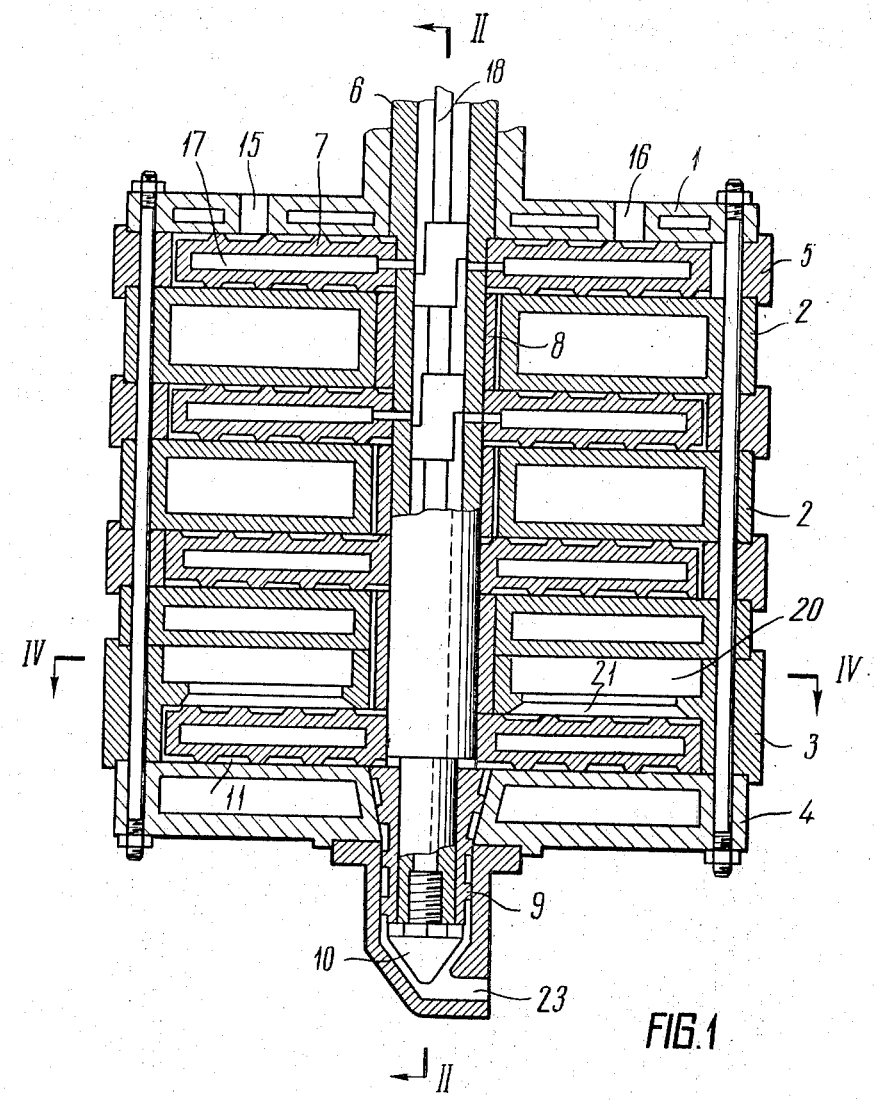
FIG. 1 is a longitudinal sectional view of the continuous polymerization reactor of the invention.
Figure 2:
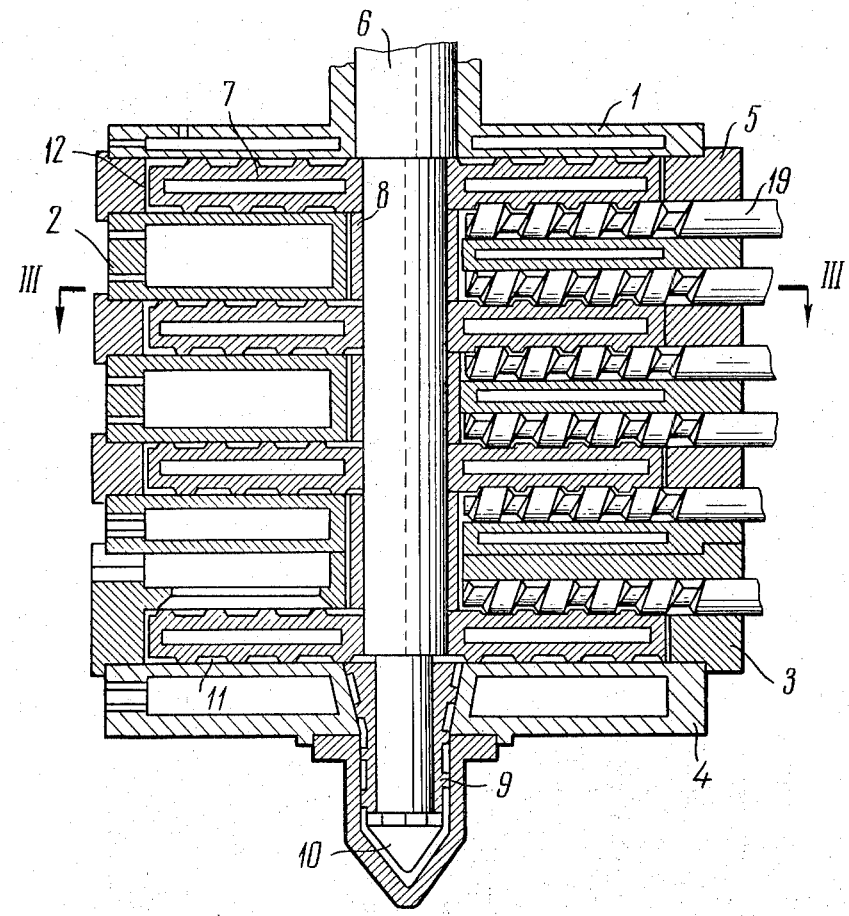
FIG. 2 is a section taken along the line II—II in FIG. 1.
Figure 3:
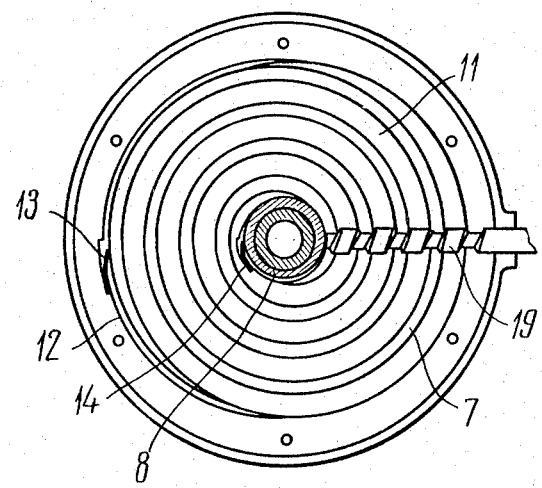
FIG. 3 is a section taken along the line III—III in FIG. 2.

In the space between the stationary discs 1, 2, 3 and 4 there are plates 7 fitted on a hollow drive shaft 6 and arranged with a minimum clear space between the flat surfaces of the stationary discs 1, 2, 3 and 4. Distance sleeves 8 are located between plates 7 and the driving shaft 6 one of the movable ends, and the driving shaft 6 mounts on a short screw 9. The plates 7, distance sleeves 8 and screw 9 are held in place on the driving shaft 6 by means of a plug 10. On both flat sides of the plates 7 helical grooves 11 are made having a trapezoidal profile (FIGS. 1 and 3). The sense in which the helical groove 11 is directed for the plates 7 is the same if viewed from either side of the helix.

One plate (FIG. 1) together with the surfaces of the stationary discs adjacent thereto constitutes one section of the reactor. The reactor as a whole consists of a plurality of such sections of identical structure.

Between the external cylindrical surface of the plates 7 and the internal cylindrical surface of the rings 5 clearances are provided for the passage of material from the upper portion (here and thereafter "upper" is used in terms of FIGS. 1-6) of the reactor section, into the lower portion of the reactor section.

Between the external cylindrical surface of the distance sleeves 8 and the internal cylindrical surface of the stationary discs 2 and 3 there is a clearance for the passage of the material from one section of the reactor into the other.

The external cylindrical surfaces of the plates 7 are made smooth and non-coaxial about the drive shaft 6 on which said plates 7 are mounted.

The extent of non-coaxiality is equal to half of the difference between the diameters of the internal cylindrical surface of the ring 5 and the external diameter of the plate 7, with the direction of the shift being different in each of the reactor sections.

Thus a variable clearance 12 of the variable section (FIG. 3) is formed between the reactor body and the external cylindrical surface of the plate 7.

On the internal cylindrical surface of the ring 5 a scraper 13 is fastened in a special cavity, said scraper 13 being a plate made of a resilient material. The dimensions of the cavity correspond to those of the scraper 13. The scraper 13 bears against the external cylindrical surface of the plate 7 over the entire height thereof.

The external cylindrical surface of the distance sleeve 8 is made smooth and non-coaxial about the driving shaft 6, while in the stationary disc 3 a scraper 14 is fastened in a cavity, said scraper 14 bearing against the external cylindrical surface of the distance sleeve 8 scraping over the entire height thereof.

In another embodiment (not shown in the drawing) the passages between the neighbouring sections of the reactor and between the upper and lower portions of the sections can be realized as follows.

The external cylindrical surfaces of the plates 7 and distance sleeves 8 are mounted concentrically to the axis of rotation of the drive shaft 6, while the internal cylindrical surfaces of the rings 5 (FIG. 1) and in the stationary discs 3 are also made non-coaxial about the drive shaft 6. The scrapers in this case must be secured on the plates 7 and on the distance sleeves 8 in special cavities provided for this purpose.

The upper stationary disc 1 is provided with charging openings 15 and 16. If necessary, such charging openings can be provided for any of the reactor sections.

The plates 7 have spaces 17 for the circulation of a heat carrier. The heat carrier is supplied into the spaces 17 through the hollow driving shaft 6 via a distributing means 18.

Riffles are made in the stationary discs wherein screws 19 are arranged (FIG. 2) with the helical thread of each of the screws superimposed with a minimum clearance adjacently with the corresponding helical thread made on the plate 7 (FIGS. 2 and 3), the helical thread of the screws 19 having a rectangular profile, with the pitch of the thread of the screw 19 being identical to that of the plate 7. The direction of rotation of the screw 19 and the thread thereof may be either right or left handed, but in any case the conveying of the material effected by the screw 19 contributes to the over all transfer of the material effected by the helical threads of the plate 7, with the volume of the material conveyed by the screw 19 depending upon the relationship between the dimensions of the profile of the grooves constituting the thread of the screw 19 and that of the plate 7, as well as upon the external diameter of the screw 19.

The shaft 6 and screws 19 are driven by a common motor (not shown). In case the number of starts of the thread of the plate 7 and of the screw 19 is the same, one revolution of the plate 7 will correspond to one revolution of the screw 19 about its axis. But should the plate 7 be in engagement with, say, a double-threaded screw, the number of revolutions of the plate will be twice that of the screw.

The profile of the helical groove 11 of the plate 7 is trapezoidal while that of the groove of the screw 19 rectangular, the flight of the thread of the screw 19 enters the helical groove 11 of the thread of the plate 7 with a minimum clearance with regard to all three sides of the helical groove 11 of the plate 7.

The flight of the thread of the screw 19 being disposed in the helical groove 11 of the plate 7 at such an angle, that it does not fully overlap the entire section of the helical groove 11 of the plate 7, as can be seen in FIG. 3, so that the material being processed, while moving along the helical grooves 11, can pass over the grooves of the thread of the screw 19 onto the other side thereof.

The sectional area ensuring this over passing increases with an increase in the angle of inclination of the thread of the screw 19, with the resistance offered to the passing of the material over the grooves of the thread of the screw 19 depending on the cross sectional area of said passage and on the direction of rotation of the screw 19.

The stationary discs 1, 2, 3 and 4 arranged in the above-described manner with the screws 19 interacting with the helical grooves 11 constitute a means for conveying the material being processed through the reactor and for uniformly distributing the material among the plates 7.

Figure 4:
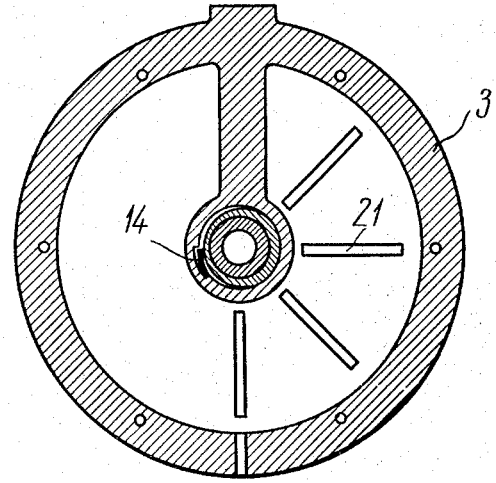
FIG. 4 is a section taken along the line IV—IV in FIG. 1.

The stationary disc 3 (FIG. 1) there is provided with an evacuation chamber 20 having an evacuation line (not shown in the drawing), said evacuation chamber communicating with the material mass being processed that in the helical grooves of the plate 7 through slits 21 (FIGS. 1 and 4).

A chink-like configuration for the openings 21 having slanting faces 22 on the edges thereof (FIG. 5) facing the plate 7 (the direction of rotation of the plate 7 being indicated by an arrow) with their radial arrangement being relative to the axis of rotation of the plate 7 as shown in FIG. 4 diminishes the probability of the material being processed from getting into the evacuation chamber 20 (FIG. 1), as the surface of the material from which the removal of volatile components is effected is increased and thus a more reliable removal of volatile components from the mass of the material being processed is enhanced.

In that section of the reactor which is provided with the evacuation chamber 20, the conditions for transferring the material being processed by the effect of the helical thread of the plate 7 are more difficult than in the other sections due to the presence of the slits 21 for the removal of volatile components, considering that these slits having a special configuration. Therefore the diameter of the screw 19 arranged in this section of the reactor must be greater than the diameters of the screws 19 arranged in all the other sections of the reactor.

If necessary, the reactor may feature more than one section adapted for the removal of volatile components from the material being processed.

The lower portion of the reactor with the short screw 9 is an extrusion section whose structure is similar to the extrusion section of a conventional screw reactor; the extrusion section of the present reactor comprises a shaping tool 23.

The peripheral speed at different points on the plates 7 is different, and this tells on the available space velocity of of the material being processed traveling along the helical grooves 11 of these plates, with the possibility of gas bubbles being formed by the boiling of the monomer. This relates mainly to the upper sides of the plates 7 where the material travels in a direction from the inner axis of the reactor to the periphery thereof. The space velocities of the material being processed traveling in the reactor increases with the viscosity of the material as the degree of conversion thereof become higher may be equalized by changing the dimensions of the profile of the helical grooves 11 by appropriately selecting the number of starts on the threads of the screws 19 and the plates 7, and also by choosing the most suitable of the above-described embodiments ensuring the passage of the material from the upper half of the reactor section into the lower half thereof.

In those sections of the reactor where the removal of volatile components takes place, the same measures are resorted to for diminishing the density and pressure of the material being processed, this being necessary for the effective removal of volatile components therefrom.

On an average, the depth of the grooves of the said threads is reasonably minimized so as to facilitate the removal of the heat of the exothermal polymerization reaction from the reaction medium. The depth of the thread grooves is chosen with due reference to its influence on the reactor performance.

The reactor proposed herein has at least four temperature zones provided for the heat carrier to circulate within the spaces of the stationary discs 1, 2, 3 and 4 and of the plates 7.

The first temperature zone, from the direction of the charging openings 15 and 16 to the shaping tool 23, provides for heating the material being processed to the temperature required for the initiation of the polymerization reaction.

The second temperature zone is provided for the removal of the heat generated due to the exothermal polymerization reaction and serves for maintaining the temperature of the reaction medium at a prescribed level.

The third zone is for of the removal of the residual monomer and other volatile substances from the polymer.

The fourth zone of the reactor maintaining the appropriate pressure, temperature or viscosity levels for the polymer melt ensures the conditions required for shaping the articles.

The proper operation of the present reactor is ensured by providing auxiliary means for preparing the monomer and for supplying it to the reactor, comprising reservoirs 24 and 25 (FIG. 6) for the monomer or as prepolymerizers intended for producing a partially polymerized monomer; a cooling means 26; and a receiving and drawing means 27 similar to those conventionally employed in the continuous production of profile articles by extrusion techniques; and a metering pump 28.

The present reactor operates as follows.

The prepared material in the form of a monomer or a partially polymerized monomer is supplied from reservoirs 24 and 25 by the metering pump 28 or from the pressure of an inert gas into the reactor 29 through one of its charging openings. If necessary, various auxiliary components in the form of a solution of the monomer can be supplied through another charging opening of the reactor.

The material to be processed entering through the charging openings 15 and 16 (FIG. 1) goes into the space between the rotating plates 7 and the stationary walls of the reactor body, and under the effect of the helical thread of the plates 7 and of the thread of the screws 19 (FIG. 2), said material moves radially from the central axis of the reactor towards its periphery along the upper side of the plate 7 and then through the clearance 12 between the reactor body and the external cylindrical surface of the plate 7 where it reaches the lower side of the plate 7 and moves along the helical grooves 11 of the thread to the centre of the reactor along the lower side of the plate 7. Further the material travels from the upper section of the reactor into the lower section thereof through the clearance between the internal cylindrical surface of the stationary disc 2 and the external cylindrical surface of the distance sleeve 8.

It should be noted that the material found in the helical grooves 11 of the thread of the plates 7 moves under the effect of forces of friction between the material and the movable and stationary surfaces of the reactor, and while in that portion of the plate 7 which is rather close to the place of engagement with the screw 19 the material moves due to the displacement thereof from the grooves of the plates 7 by the flights of the thread of the screw 19 causing sheering stresses as, there is a definite resistance offered to the passage of the material over the grooves of the screw 19 to the other side thereof, this resistance depending on the viscosity of the material. Therefore the conditions existing for the transfer of the material in the reactor are less dependent on the forces of friction between the material and the movable and stationary surfaces of the reactor. This is of particular importance, since the polymerization reaction proceeds with an ever increasing viscosity of the medium.

Thus, while the drive shaft 6 is in rotation, the material being processed moves downwardly through all the reactor sections in succession.

An effective mixing of the material caused by the shearing strains originating between the rotating plates 7 and the reactor walls promotes good distribution of the separately supplied components and rapid heating of the material by the reactor walls to the temperature required for the polymerization reaction to be initiated in the first temperature zone of the reactor.

The speed of polymerization is different in different conversion ranges, therefore the second temperature zone of the reactor should comprise such a number of sections so as to ensure optimum temperature conditions for the reaction medium at the different degrees of conversion thus enhancing of the overall speed of the polymerization reaction.

Since the polymerization reaction in the second temperature zone of the reactor is exothermic heat is removed from the reaction medium therein as the material being processed is in the form of a thin layer while under the conditions of shearing strains between the surfaces moving in relation to each other and with the heat carrier circulating there behind, the reaction is easy to control, and polymerization can be run at a comparatively high temperature without the risk of the material being overheated in bulk. This is particularly true for those sections of the reactor wherein the degrees of conversion of the polymerization are high and the reaction medium is highly viscous.

During the last stages of conversion, the reaction speed is lower and, hence, the amount of heat to be removed from the reaction medium is smaller accordingly; therefore the last plates 7 of the second temperature zone of the reactor need not have spaces for the circulation of the heat carrier.

In those zones of the reactor where the material is mostly monomeric, the possibility of the material sticking in the grooves of said threads is precluded by the engagement of the thread of the screws 19 with that of the plates 7 those being made with a minimum clearance, whereby the material stuck onto them are mutually cleaned thereby.

In those places where the material transfer from the upper half of the reactor section to the lower half thereof no crust of the stuck material is formed, the material being cleaned off the reactor body is accomplished by the action of the external cylindrical surface of the plate 7 and by the scraper 13 (FIG. 3).

The scraper 14 and the distance sleeve 8 clean the surfaces of the reactor in those places where the material is transferred among its neighbouring sections in a similar manner.

As the plates 7 rotate, the material found in the places of transfer between the upper and lower halves of the reactor section is entrained into the wedge-shaped portion of the clearance 12, whee it is subject to intensive shearing forces. This action may be employed as a means for controlling the molecular weight of the material being polymerized by virtue of mechanical destruction.

The material being processed in the form of the polymer melt with a relatively high viscosity, goes from the second temperature zone into the zone, for the removal of residual monomer and other volatile substances. As the polymer melt moves along the upper side of the plate 7, a high resistance to the material is encountered when passing over the grooves of the screw 19 to the other side thereof due to the high viscosity of the material. Owing to this fact, and also owing to the fact that within this temperature zone of the reactor the material travels in a direction from the axis of the reactor towards its periphery where the space velocity is higher, and as a result the material being conveyed by the screw 19 in said zone of the reactor creates a region with a reduced pressure on the upper side of the plate 7, where the material does not fill the entire free space available in the helical grooves 11.

Slits 21 (FIG. 1) through which the evacuation chamber 20 communicates with the mass of the material being processed are located along that region of the upper side of the plate 7 where the reduced pressure zone is created. The reactor section with the zone the removal of volatile components is limited by the above zone and below by the area where densification of the material takes place, so that a reduced pressure is maintained only within the zone for the removal of volatile components.

The inner space of the movable disc 7 in this section of the reactor has a special inlet for the heat carrier (not shown in the drawing).

All this provides favourable conditions for the removal of the residual monomer and other volatile substances from the polymer melt.

The polymer melt is fed from the zone of the removal of volatile components to the extrusion zone of the reactor wherein the required temperature, viscosity and pressure are maintained, and the material being extruded therefrom through the shaping tool 23 in the form of an endless profile article takes place.

The present reactor is designed for carrying out continuous polymerization of a monomer and, in combination with a shaping tool, can be employed for a continuous production of profile articles from the polymer melt, such as tubes or pipes, bands, rods, and the like.

The present reactor without the evacuation chamber can be employed in the continuous preparation of a prepolymer with a high degree of conversion, with the object of feeding such prepolymer directly into any conventional screw extruder with an evacuation zone for producing polymer profile articles.

The reactor having sections and provided with an evacuation chamber, as described hereinabove, can be used for carrying out polycondensation reactions.

The present reactor can be employed also as a continuous-action mixer for preparing high-viscosity compositions from powdered and liquid components, e.g., for preparing paste-like compositions such on based on polyvinyl chloride.

What is claimed is:

1. Continuous polymerization reactor, comprising a stationary disc, having charging openings to feed the material being processed into said reactor, and a space for a heat carrier circulation,
 a driving shaft, rotatably mounted in said stationary disc;
 a reaction section comprising
  a. a ring, abutting the said stationary disc with one of its flat sides,
  b. a stationary disc with a space for the heat carrier circulation, having on its both flat sides radially extended riffles and abutting the opposite side of said ring,
  c. a plate, having on its both flat sides helical grooves and mounted with a clear space relative to flat sides of said stationary discs, the inner cylindrical surface of said ring and the outer cylindrical surface of said plate forming a clearance for the material transfer from the helical groove located on one of the flat sides of said plate into the helical groove located on the opposite side of said plate,
  d. screws situated on said radially extended riffles of the stationary disc, the flights of the helical thread of the screw, located in the riffle on the side of said stationary disc, facing said plate being engaged with said helical grooves, and the flights of the helical thread of the screw, located in the riffle on the opposite side of said stationary disc being engaged with the helical grooves of the plate, belonging to the next section of the reactor,
  e. a distance sleeve, fixed on said driving shaft with its butt-end rested on the flat surface of said plate, the outer cylindrical surface of said distance sleeve and the inner cylindrical surface of said stationary disc forming a clearance for the processed material transfer from said section into the next section of the reactor,
 an intermediate section, comprising
  a. a ring abutting with one of its flat sides the stationary disc of the preceding section,
  b. a plate fixed on said driving shaft, having on its both flat sides helical grooves mounted with a clear space relative to flat sides of the stationary discs of the foregoing and next sections, the inner cylindrical surface of said ring and the outer cylindrical surface of said plate forming a clearance for the material transfer from the helical groove on one of the flat sides of said plate into the helical groove on the opposite side of said plate;
 a degassing section, comprising
  a. a stationary disc with a space for the heat carrier circulation, having on its flat side abutting said ring of the preceding section a radially extended riffle,
  b. situated in said radially extended riffle of the stationary disc a screw, its helical thread flights being engaged with the helical groove of said plate belonging to the preceding section,
  c. a stationary disc abutting the said disc, supplied with an evacuation chamber, forming an annular recess on its side abutting the formerly mentioned stationary disc, a recess on the opposite side, slits, connecting said evacuation chamber with said recess, and radially extended riffle on the flat surface of said recess,
  d. fixed on said driving shaft a plate, having on its both flat sides helical grooves and mounted with a clear space relative to the flat surface of said recess and to that of the next section stationary disc, the inner cylindrical surface of said recess and the outer cylindrical surface of said plate forming a clearance for the material transfer from said helical groove on a flat side of the plate into the helical groove on the opposite flat side of said plate,
  e. a distance sleeve, fixed on said driving shaft with its butt-end rested on the flat surface of said plate, its other butt-end being rested on the flat surface of the preceding section plate, the outer cylindrical surface of said distance sleeve and inner cylindrical surfaces of said stationary discs forming a clearance for the processed material transfer from the helical grooves of said plate of the preceding section into those of said plate,
  f. situated in said radially extended riffle a screw, its helical thread flights being engaged with said helical grooves on the side of said plate facing the flat surface of said recess,
 an extrusion section, comprising
  a. a stationary disc with a space for the heat carrier circulation, abutting the last-mentioned stationary disc with its flat side,
  b. means for the processed material extrusion and molding;
 a means for imparting rotation to the driving shaft and all the mentioned screws and the mentioned stationary discs and rings fixed in the abutting relationships as described so as to define a continuous reactor body.

2. Continuous polymerization reactor as defined in claim 1, comprising more than one reaction section and more than one degassing section, an intermediate section being placed between said sections for the processed material transfer from the reaction section into the degassing one, and a stationary disc being placed between said sections for the processed material transfer from the degassing section into the reaction one, as defined in claim 1.

3. Continuous polymerization reactor as defined in claim 1, in which certain of said rings and/or said stationary discs are supplied with charging openings for feeding additional materials into the reactor.

4. Continuous polymerization reactor as defined in claim 1, in which said plates are supplied with spaces for the heat carrier circulation.

5. Continuous polymerization reactor as defined in claim 1, in which said helical grooves on the flat sides of said plates have trapezoidal profiles and engaged with them said flights of said screws have rectangular cross-sections.

6. Continuous polymerization reactor, comprising
 a stationary disc, having charging openings for feeding the material being processed into said reactor, and a space for a heat carrier circulation,
 a driving shaft, rotatably mounted in said stationary disc;
 a reaction section comprising
  a. a ring, abutting the said stationary disc with one of its flat sides, b. a stationary disc with a space for the heat carrier circulation having on its both flat sides radially extended riffles and abutting the opposite side of said ring, c. a plate, fixed on said driving shaft having on its both flat sides helical grooves, and mounted with a clear space relative to flat sides of said stationary discs, the inner cylindrical surface of said ring and the outer cylindrical surface of said plate being non-coaxial about each other, but one of them being coaxial about said driving shaft, so that said cylindrical surfaces form a clearance for the material transfer from the helical groove located on one of the flat sides of said plate, into the helical groove located on the opposite side of said plate, d. a scraper situated in said clearance and fixed in a cavity, located on the cylindrical surface, forming said clearance which is coaxial about said driving shaft, and being in a wiping contact with the cylindrical surface which is noncoaxial about said driving shaft along its generating line, e. screws, situated in said radially extended riffles of the stationary disc, the flights of the helical thread of the screw located in the riffle on the side of said stationary disc facing said plate, being engaged with said helical grooves, and the flights of the helical thread of the screw, located in the riffle on the opposite side of said stationary disc being engaged with the helical grooves of the plate, belonging to the next section of the reactor, f. a distance sleeve, fixed on said driving shaft with its butt-end rested on the flat surface of said plate, the outer cylindrical surface of said distance sleeve and the inner cylindrical surface of said stationary disc being non-coaxial about each other, but one of them being coaxial about said driving shaft, so that said cylindrical surfaces form a clearance for the processed material transfer from said section into the next section of the reactor;

an intermediate section, comprising a. a ring, abutting with one of its flat sides the stationary disc of the preceding section, b. a plate, fixed on said driving shaft having on its both flat sides helical grooves, mounted with a clear space relative to flat sides of the stationary discs of the preceding and the next sections, the inner cylindrical surface of said ring and the outer cylindrical surface of said plate being non-coaxial about each other, but one of them being coaxial about said driving shaft, so that said cylindrical surfaces form a clearance for the material transfer from the helical groove on one of the flat sides of said plate into the helical groove on the opposite side of said plate;

c. a scraper, situated in said clearance and fixed in a cavity, located on the cylindrical surface which is coaxial about said driving shaft and is in a wiping contact with the cylindrical surface non-coaxial about said driving shaft along its generating line, a degassing section, comprising a. a stationary disc with a space for the heat carrier circulation, having on its flat side abutting said ring of the foregoing section a radially extended riffle, b. a scraper, situated in said clearance and fixed in a cavity, located on the cylindrical surface, forming said clearance, which is coaxial about said driving shaft, and is in a wiping contact with the cylindrical surface non-coaxial about said driving shaft along its generating line, c. situated in said radially extended riffle of the stationary disc a screw, its helical thread flights being engaged with the helical groove of the said plate belonging to the foregoing section, d. a stationary disc, abutting said disc, supplied with an evacuation chamber, forming an annular recess on its side abutting the formerly mentioned stationary disc, a recess on the opposite side, slits connecting said evacuation chamber with said recess, and radially extended riffle on the flat surface of said recess, e. fixed on said driving shaft a plate having on its both flat sides helical grooves and mounted with a clear space relative to the flat surface of said recess and to that of the next section stationary disc, the inner cylindrical surface of said recess and the outer cylindrical surface of said plate being non-coaxial about each other but one of them being coaxial about said driving shaft, so that said cylindrical surfaces form a clearance for the material transfer from said helical groove on a flat side of the plate into the helical groove on the opposite flat side of said plate, f. a scraper situated in said clearance and fixed in a cavity located on that of the cylindrical surfaces forming said clearance which is coaxial about said driving shaft and being in a wiping contact with the cylindrical surface non-coaxial about said driving shaft along its generating line, g. a distance sleeve fixed on said driving shaft with its butt-end rested on the flat surface of said plate, its other butt-end being rested on the flat surface of the preceding section plate, the outer cylindrical surface of said distance sleeve and inner cylindrical surfaces of said stationary discs being non-coaxial about each other but one of them being coaxial about said driving shaft, so that said cylindrical surfaces form a clearance for the processed material transfer from the helical grooves of said plate of the preceding section into those of said plate, h. a scraper situated in said clearance and fixed in a cavity located on that of the cylindrical surfaces forming said clearance which is coaxial about said driving shaft, and being in a wiping contact with the cylindrical surface which is non-coaxial about said driving shaft along its generating line, i. situated in said radially extended riffle a screw, its helical thread flights being engaged with said helical grooves on the side of said plate facing the flat surface of said recess, an extrusion section comprising a. a stationary disc with a space for the heat carrier circulation, abutting with its flat side the last-mentioned stationary disc, and b. means for the processed material extrusion and molding a means for imparting rotation to the driving shaft and all the mentioned screws and the mentioned stationary discs and rings fixed in the abutting relationships as described so as to define a continuous reactor body.

7. Continuous polymerization reactor, comprising a stationary disc, having charging openings to feed the material being processed into said reactor, and a space for a heat carrier circulation, a driving shaft, rotatably mounted in said stationary disc;

a reaction section comprising
 a. a ring, abutting the said stationary disc with one of its flat sides,
 b. a stationary disc with a space for the heat carrier circulation, having on its both flat sides radially extended riffles and abutting the opposite side of said ring,
 c. a plate, having on its both flat sides helical grooves and mounted with a clear space relative to flat sides of said stationary discs, the inner cylindrical surface of said ring and the outer cylindrical surface of said plate forming a clearance for the material transfer from the helical groove located on one of the flat sides of said plate into the helical groove located on the opposite side of said plate,
 d. screws situated in said radially extended riffles of the stationary disc, the flights of the helical thread of the screw, located in the riffle on the side of said stationary disc, facing said plate being engaged with said helical grooves, and the flights of the helical thread of the screw, located in the riffle on the opposite side of said stationary disc being engaged with the helical grooves of the plate, belonging to the next section of the reactor,
 e. a distance sleeve, fixed on said driving shaft with its butt-end rested on the flat surface of said plate, the outer cylindrical surface of said distance sleeve and the inner cylindrical surface of said stationary disc forming a clearance for the processed material transfer from said section into the next section of the reactor, an intermediate section, comprising
 a. a ring abutting with one of its flat sides the stationary disc of the preceding section,
 b. a plate fixed on said driving shaft, having on its both flat sides helical grooves mounted with a clear space relative to flat sides of the stationary discs of the foregoing and next sections, the inner cylindrical surface of said ring and the outer cylindrical surface of said plate forming a clearance for the material transfer from the helical groove on one of the flat sides of said plate into the helical groove on the opposite side of said plate;

a degassing section, comprising
 a. a stationary disc with a space for the heat carrier circulation, having on its flat side abutting said ring of the preceding section a radially extended riffle,
 b. situated in said radially extended riffle of the stationary disc a screw, its helical thread flights being engaged with the helical groove of said plate belonging to the preceding section,
 c. a stationary disc abutting the said disc, supplied with an evacuation chamber, forming an annular recess on its side abutting the formerly mentioned stationary disc, a recess on the opposite side, slits connecting said evacuation chamber with said recess, and radially extended riffle on the flat surface of said recess,
 d. fixed on said driving shaft a plate, having on its both flat sides helical grooves and mounted with a clear space relative to the flat surface of said recess and to that of the next section stationary disc, the inner cylindrical surface of said recess and the outer cylindrical surface of said plate forming a clearance for the material transfer from said helical groove on a flat side of the plate into the helical groove on the opposite flat side of said plate,
 e. a distance sleeve, fixed on said driving shaft with its butt-end rested on the flat surface of said plate, its other butt-end being rested on the flat surface of the preceding section plate, the outer cylindrical surface of said distance sleeve and inner cylindrical surfaces of said stationary discs forming a clearance for the processed material transfer from the helical grooves of said plate of the preceding section into those of said plate,
 f. situated in said radially extended riffle a screw, its helical thread flights being engaged with said helical grooves on the side of said plate facing the flat surface of said recess, said slits in the above degassing section being disposed next to the last-mentioned screw in the direction of said plate rotation and having slanting faces on the side facing the latter;

an extrusion section, comprising
 a. a stationary disc with a space for the heat carrier circulation, abutting the last-mentioned stationary disc with its flat side,
 b. means for the processed material extrusion and molding;

a means for imparting rotation to the driving shaft and all the mentioned screws and the mentioned stationary discs and rings fixed in the abutting relationships as described so as to define a continuous reactor body.

8. Continuous polymerization reactor, comprising a stationary disc, having charging openings for feeding the material being processed into said reactor and a space for a heat carrier circulation, a driving shaft, rotatably mounted in said stationary disc;

one or more successively situated reaction sections, each of the sections comprising
 a. a ring, abutting with one of its flat sides the said stationary disc,
 b. a stationary disc with a space for the heat carrier circulation, having on its both flat sides radially extended riffles and abutting the opposite side of said ring,
 c. a plate, fixed on said driving shaft, having on its both flat sides helical grooves and mounted with a clear space relative to flat sides of said stationary discs, the inner cylindrical surface of said ring and the outer cylindrical surface of said plate being non-coaxial about each other, but one of them being coaxial about said driving shaft, so that said cylindrical surfaces form a clearance for the material transfer from the helical groove located on one of the flat sides of said plate, into the helical groove located on the opposite side of said plate, d. a scraper, situated in said clearance and fixed in a cavity, located on the cylindrical surface, forming said clearance which is coaxial about said driving shaft, and being in a wiping contact with the cylindrical surface which is non-coaxial about said driving shaft along its generating line, e. screws, situated in said radially extended riffles of the stationary disc, the flights of the helical thread of the screw, located in the riffle on the side of said stationary disc facing said plate, being engaged with said helical grooves, and the flights of the helical thread of the screw, located in the riffle on the opposite side of said stationary disc, being engaged with the helical grooves of the plate, belonging to the next section of the reactor, f. a distance sleeve, fixed on said driving shaft with its butt-end rested on the flat surface of said plate, the outer cylindrical surface of said distance sleeve and the inner cylindrical surface of said stationary disc being non-coaxial about each other, but one of them being coaxial about said driving shaft, so that said cylindrical surfaces form a clearance for the processed material transfer from said section into the next section of the reactor;

an intermediate section, comprising a. a ring, abutting with one of its flat sides the stationary disc of the preceding section, b. a plate, fixed on said driving shaft having on its both flat sides a helical groove, mounted with a clear space relative to flat sides of the stationary discs of the preceding and next sections, the inner cylindrical surface of said ring and the outer cylindrical surface of said plate being non-coaxial about each other, but one of them being coaxial about said driving shaft, so that said cylindrical surfaces form a clearance for the material transfer from the helical groove on one of the flat sides of said plate into the helical groove on the opposite side of said plate;

c. a scraper, situated in said clearance and fixed in a cavity, located on the cylindrical surface which is coaxial about said driving shaft and is in a wiping contact with the cylindrical surface non-coaxial about said driving shaft along its generating line;

an extrusion section, comprising a. a stationary disc with a space for the heat carrier circulation, abutting with its flat side the flat side of the intermediate section ring and b. means for extrusion and molding of the processed material, a means for imparting rotation to the driving shaft and all the mentioned screws and the mentioned stationary discs and rings fixed in the abutting relationships as described so as to define a continuous reactor body.

9. Continuous polymerization reactor, as defined in claim 8 in which certain of said rings and/or said stationary discs are supplied with openings for feeding additional materials into the reactor.

10. Continuous polymerization reactor, comprising a stationary disc having charging openings for feeding the material being processed into said reactor and a space for the heat carrier circulation, a driving shaft rotatably mounted in said stationary disc;

an intermediate section, comprising a. a ring abutting with one of its flat sides said stationary disc, b. a plate fixed on said driving shaft, having on its both flat sides helical grooves mounted with a clear space relative to flat sides of the stationary discs of the preceding and next sections, the inner cylindrical surface of said ring and the outer cylindrical surface of said plate being non-coaxial about each other but one of them being coaxial about said driving shaft so that said cylindrical surfaces make a clearance for the material transfer from the helical groove on a flat side of said plate into the helical groove on the opposite side of said plate, c. a scraper situated in said clearance and fixed in a cavity located on that of the two cylindrical surfaces which is coaxial about said driving shaft and being in a wiping contact with the cylindrical surface non-coaxial about said driving shaft along its generating line;

several consecutively situated degassing sections, each comprising a. a first stationary disc with a space for the heat carrier circulation, having on its flat side, facing the preceding section, a radially extended riffle, b. a scraper situated in said clearance and fixed in a cavity, located on the cylindrical surface, forming said clearance which is coaxial about said driving shaft, the scraper being in a wiping contact with the cylindrical surface, non-coaxial about said driving shaft along its generating line, c. a screw situated in said radially extended riffle of the stationary disc, its helical thread flights engaged with the helical groove of said plate belonging to the preceding section, d. abutting said first disc a second stationary disc, supplied with an evacuation chamber, forming an annular recess on its side abutting the first stationary disc, a recess on the opposite side, slits connecting said evacuation chamber with said recess, a radially extended riffle on the flat surface of said recess, e. fixed on said driving shaft a plate, having on its both flat sides helical grooves and mounted with a clear space relative to the flat surface of said recess and to that of the next section stationary disc, the inner cylindrical surface of said recess and the outer cylindrical surface of said plate being non-coaxial about each other, but one of them being coaxial about said driving shaft, so that said cylindrical surfaces form a clearance for the material transfer from said helical groove on a flat side of the plate into the helical groove on the opposite side of said plate f. a scraper, situated in said clearance and fixed in a cavity, located on the cylindrical surface forming said clearance which is coaxial about said driving shaft, the scraper being in a wiping contact with the cylindrical surface non-coaxial about said driving shaft along its generating line, g. a distance sleeve fixed on said driving shaft with its butt-end rested on the flat surface of the preceding section plate, and the other butt-end rested on the flat surface of the preceding section plate, the outer cylindrical surface of said distance sleeve and the inner cylindrical surfaces of said stationary discs being non-coaxial about each other but one of them being coaxial about said driving shaft, so that said cylindrical surfaces form a clearance for the processed material transfer from the helical grooves of said preceding section plate into the helical grooves of said plate, h. a scraper, situated in said clearance and fixed in a cavity, located on the cylindrical surface forming said clearance which is coaxial about said driving shaft, the scraper being in a wiping contact with the cylindrical surface non-coaxial about said driving shaft along its generating line, i. a screw situated in said radially extended riffle, the flights of the helical thread of the screw being engaged with said helical grooves on the side of said plate, facing the flat surface of said recess, j. the flat side of the first stationary disc of the first degassing section abutting the other flat side of said ring of the intermediate section, and the flat side of the first stationary disc of each consecutive degassing section abutting the flat side of the second stationary disc of the preceding degassing section;

an extrusion section, comprising
  a. a stationary disc with a space for the heat carrier circulation, abutting with a flat side said second stationary disc of the preceding section, and
  b. means for extrusion and molding of the processed material a means for imparting rotation to the driving shaft and all the mentioned screws and the mentioned stationary discs and rings fixed in the abutting relationships as described so as to define a continuous reactor body.

11. Continuous polymerization reactor, as defined in claim 10 in which certain of said rings and/or said stationary discs are supplied with charging openings for feeding additional materials into the reactor.

* * * * *